United States Patent
Shelp et al.

(10) Patent No.: US 7,160,430 B2
(45) Date of Patent: Jan. 9, 2007

(54) ELECTROCHEMICAL TREATMENT OF AMMONIA IN WASTE-WATER

(75) Inventors: Gene Sidney Shelp, Guelph (CA); Leonard Paul Seed, Guelph (CA)

(73) Assignee: ENPAR Technologies Inc., Guelph (CA)

( * ) Notice: Subject to any disclaimer, the term of this patent is extended or adjusted under 35 U.S.C. 154(b) by 441 days.

(21) Appl. No.: 10/662,818

(22) Filed: Sep. 16, 2003

(65) Prior Publication Data

US 2004/0134796 A1    Jul. 15, 2004

(30) Foreign Application Priority Data

Sep. 16, 2002   (GB)   .................................. 0221439.3

(51) Int. Cl.
*B01J 39/08* (2006.01)
*C02F 1/42* (2006.01)
*C02F 1/20* (2006.01)
*C01C 1/10* (2006.01)
*C25B 9/00* (2006.01)
*C25B 1/00* (2006.01)

(52) U.S. Cl. .................. 205/617; 205/742; 204/233; 204/234; 210/668; 210/677; 210/681; 210/750; 95/158; 96/193

(58) Field of Classification Search .................. None
See application file for complete search history.

(56) References Cited

U.S. PATENT DOCUMENTS 3,929,600 A    12/1975   Hiasa et al.
4,093,544 A *  6/1978   Ross ........................... 95/158
4,098,690 A    7/1978   Semmens
5,512,182 A    4/1996   Sheikh et al.
6,835,298 B1 * 12/2004   Oloman et al. ............. 205/617
6,878,284 B1 *  4/2005   Hasegawa et al. ........... 210/660

FOREIGN PATENT DOCUMENTS

| DE | 3530498 | 3/1987 |
| EP | 029536 | 6/1981 |
| GB | 2383034 | 6/2003 |
| JP | 59039395 | 3/1984 |
| WO | WO97/30941 | 8/1997 |

* cited by examiner

*Primary Examiner*—Harry D. Wilkins, III
(74) *Attorney, Agent, or Firm*—Anthony Asquith Corp.

(57) ABSTRACT

In a sewage treatment plant, dissolved ammonium is extracted from the waste-water stream, and is transferred to a body of secondary water. The secondary water is passed through an electrolysis station, where the ammonium is transformed to nitrogen gas. The capture and transfer can be done by ion-exchange, the electrolysis then being done on the regenerant water. Or the capture and transfer can be done by first transforming the dissolved ammonium to ammonia gas by raising the pH of the waste-water, then passing the ammonia gas through acidic secondary-water, in which the ammonia dissolves, the electrolysis then being done on the acid-water. The electrolysed, ammonium-diminished, secondary-water can be re-used in further capture/transfer episodes. The secondary-water does not mix with the waste-water stream.

22 Claims, 4 Drawing Sheets

ELECTROCHEMICAL TREATMENT OF AMMONIA IN WASTE-WATER

This invention relates to the breakdown of dissolved ammonia and ammonium, in waste-water, and to the desideratum of discharging the resulting nitrogen in the form of nitrogen gas. It is known that treatment of ammonium-water by electrolysis can release the nitrogen in the form of nitrogen gas, and the present invention aims to improve the cost-effectiveness of that electrolysis technology.

BACKGROUND TO THE INVENTION

The traditional non-electrolytic methods of breaking down and removing ammonia and ammonium from water have basically involved engineering a system which exposes the water to oxygen. The oxidation reactions are promoted, which usually have had a high aerobic micro-biological component. However, such oxidation reactions predominantly leave the nitrogen in the form of (dissolved) nitrate and of the various (gaseous) oxides of nitrogen. These nitrogen compounds themselves can be health hazards, and should not be simply discharged into the environment, at least not in the large quantities that arise from treating waste-water.

Patent publication U.S. Pat. No. 6,083,377 (Lin+Shelp, July 2000) describes the use of electrolysis, in effecting the direct breakdown of ammonium to nitrogen gas. Effective though it can be, under many conditions, the disclosed electrolysis technology works best when the concentration of ammonium is high. When the concentration is low, the amount of electrical energy needed to drive current through the electrolytic cells can spoil the economics of the process. If the energy usage is kept economical, the ammonium content of the discharged water, though diminished, still might be too high.

It is an aim of the present invention to provide (a) that the ammonium in waste-water is converted, by electrolysis, directly to nitrogen gas; (b) that the concentration level of ammonia and ammonium in the discharged water is acceptably low; and yet (c) that only an economic amount of electrical energy is required.

Breaking down ammonium by electrolysis, when properly engineered and operated, avoids the formation of the unwanted and toxic oxidation products. Also, it is recognised that electrolytic treatment is much less dependent on ambient temperature than aerobic micro-biological oxidation. That is to say, electrolysis is a preferred method, especially in cold climates, for achieving the required diminishment of ammonium, if it could be done more economically.

THE INVENTION IN RELATION TO THE PRIOR ART

In the invention, preferably an ammonium-extraction-and-transfer station is provided, in which the ammonium is taken out of solution from the stream of waste-water. Preferably, the extracted ammonium is transferred back into solution, but now into a body of secondary-water. Preferably, the secondary-water does not mix with the waste-water.

The body of secondary-water is provided as a vehicle for receiving the ammonium extracted from the waste-water. Now, the designer can engineer the system to ensure that the waste-water discharged from the apparatus has a low enough ammonium content that the treated waste-water can be discharged into the environment, while at the same time ensuring that the ammonium concentration in the secondary-water is considerably higher than was the concentration in the incoming waste-water.

It is recognised that the designer can focus on engineering the ammonium treatment when the ammonium is in the secondary-water, whereas, when the ammonium is in the waste-water, it was all too possible that having to deal with the flow of waste-water could compromise the engineering of the ammonium treatment. The ammonium in the secondary-water, being more concentrated than the ammonium in the incoming waste-water, is easier to treat, in that the higher the concentration, the greater the rate at which the breakdown reactions can take place. This would be true even if the ammonium were to be removed by the traditional aerobic microbial oxidation methods. However, it is recognised that the higher concentration of ammonium in the body of secondary-water makes it hugely more economical to extract the ammonium from the secondary-water by electrolysis, than it was to extract the ammonium from the waste-water itself, directly, by electrolysis.

Preferably, the secondary-water is circulated through an electrolytic cell, whereby the ammonium in the secondary-water is broken down. Preferably, the cell is operated in such manner that the redox voltage of the secondary-water (the electrolyte comprising the secondary-water) and the pH of the secondary-water, are such that the ammonium breaks down in such manner that the nitrogen component of the ammonium takes the form of nitrogen gas. The said U.S. Pat. No. 6,083,377, to which attention is hereby directed, shows how to operate an electrolytic cell such that the desired conditions of Eh and pH can be realised, which will lead to the formation of nitrogen gas.

It is recognised that the amount of electrical energy needed to break dissolved ammonium down to nitrogen gas is well within the limits of what is economically practical, under a wide range of conditions, when the electrolysis is done on the secondary-water. By contrast, when the electrolysis was done on the waste-water directly, only under a narrow range of conditions could the system be run economically. It is recognised in the invention that the conversion of dissolved ammonium directly to nitrogen gas can be engineered substantially more cost-effectively when the ammonium has been transferred out of the waste-water and into the secondary water, than when the ammonium was dissolved in the waste-water itself.

The invention aims to provide a system in which the treated waste-water is discharged with only a negligibly-low ammonium content, yet which can be run economically under a wide range of conditions.

In the systems as described herein, the ammonium is taken out of the stream of waste-water, and transferred to the body of secondary-water. This can be accomplished in a number of ways, of which two are described in detail. The electrolysis step, which is carried out on the secondary-water, and which converts the dissolved ammonium to nitrogen gas, can be carried out economically in the two cases.

The two ways in which ammonium can be extracted from the waste-water stream and placed in solution in the secondary water are referred to in this specification as the ion-exchange system and the alkali-acid system.

The ion-exchange system is preferred when dealing with large quantities of waste-water in which the ammonium concentration is medium to low. The alkali-acid system is more suitable when the ammonium concentration in the waste-water is higher. In many installations, it happens that, when a high-volume low-concentration stream is present, a low-volume high-concentration stream is also present, and both need to be treated. In those cases, it is economical to treat the high-concentration stream with the alkali-acid system; and then, the effluent discharged from that system would be added to the large-volume low-concentration stream entering the ion-exchange system.

Other systems for extracting ammonium from a waste-water stream and transferring the extracted ammonium to the body of secondary-water, besides the two systems as described herein, may be utilised as required under different circumstances. In each case, the preference lies in the fact of electrolysing not the waste-water itself but the secondary water.

With regard to the ion-exchange system as described herein, it is well known that dissolved ammonium can be removed from waste-water by ion-exchange. A solid body of sorbent medium is provided, and the waste-water containing the ammonium passes through the medium. The ammonium is sorbed out of solution in exchange for a cation (such as sodium), and the medium retains the ammonium ions on the material.

When the ion-exchange medium becomes saturated with ammonium, now the ammonium has to be removed therefrom. The flow of waste-water is shut off, or diverted away from the sorbent body, and a volume of regenerant-water is flushed through the sorbent body. The regenerant-water contains a high concentration of dissolved sodium chloride, and the sodium ions displace the ammonium ions sorbed on the sorbent body. The ammonium ions then pass into solution in the regenerant-water.

After the medium has been flushed, the waste-water flow can be fed therethrough and the medium will once again act to sorb ammonium out of the waste-water. The ammonium has now been transferred to the regenerant-water, which is now at a higher ammonium-concentration level than was the waste-water. The regenerant-water, in the ion-exchange system, comprises the secondary-water of the invention.

The alkali-acid system as described herein makes use of the fact that the solubility of ammonium and the associated ammonia varies considerably as a function of the pH of the water in which it is dissolved. At high pH, ammonium has a very low solubility, whereby if ammonium is present in the water when the pH of the water is increased, under the right thermodynamic conditions ammonia will bubble out of the water as a gas. Equally, the solubility of ammonium in low-pH water is much higher; thus, low-pH water will readily take ammonia gas into solution.

In the alkali-acid system, the pH of the waste-water stream is raised (e.g by the addition of sodium hydroxide to the stream), and the resulting gaseous ammonia is extracted in an air stream. Often, the effluent waste-water can be simply discharged, despite its having a high pH; where the elevated alkalinity is a problem, pH reduction measures would be needed. The air/ammonia stream now passes though a body of low-pH (acid) water, and the ammonia is taken into solution therein. This acid-water, in the alkali-acid system, comprises the secondary-water of the invention.

The apparatus of the invention preferably includes an ammonium-extraction-and-transfer station and an electrolysis station. The body of secondary-water preferably is contained in a secondary-water circuit, which conducts the secondary-water from the ammonium-extraction-and-transfer station, where the secondary-water receives the ammonium, to the electrolysis station, where the dissolved ammonium is transformed into nitrogen gas.

Preferably, the secondary-water, having been electrolysed in the electrolysis station, is circulated and recirculated back through the ammonium-transfer station. It would spoil the cost-effectiveness of the overall system considerably if the secondary-water were simply to be discharged after one single pass through the electrolysis station.

Preferably, the secondary-water should be provided as just one single volume, which can be circulated and recirculated, more or less indefinitely, between the ammonium-transfer station and the electrolysis station. Preferably, the body of secondary-water should remain separate from the stream of waste-water, i.e the two should not be mixed. The secondary-water should be contained in suitable water-containing components (treatment columns, pipes, tanks, valves, pumps, etc), which are arranged to keep the secondary-water separate from the waste-water.

DETAILED DESCRIPTION OF PREFERRED EMBODIMENTS

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
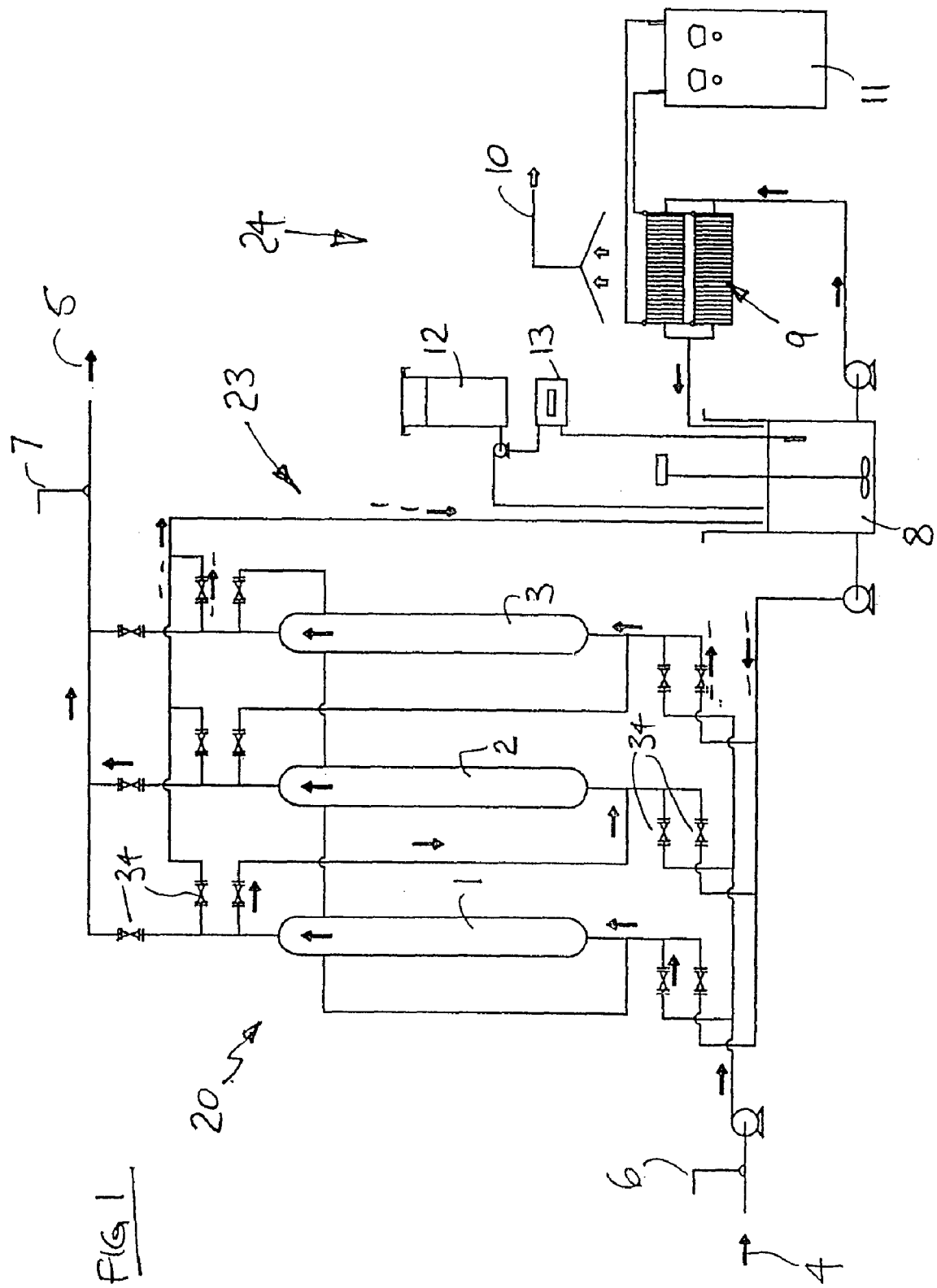
FIG. 1 is a diagram showing elements of apparatus that have been combined and configured to operate in accordance with the invention.

In the FIG. 1 apparatus, ammonium is taken out of a waste-water stream by sorption onto a suitable sorbent medium, leaving the waste-water stream clean enough to be discharged. The ammonium is removed from the sorbent medium, and transferred to a body of secondary water, by ion-exchange. The secondary-water, now containing the ammonium, is passed through an electrolysis station, where the ammonium is transformed into nitrogen gas.

FIG. 1 shows waste-water to be treated entering the apparatus 20 through an inlet port 4, and passing through a sorption station 23, which includes ion-exchange columns 1,2,3. The waste-water may be passed through just one of the columns, or through more than one of the columns, in series. Ammonium in the waste-water is sorbed onto bodies of sorbent media material in the columns. The treated waste-water then passes out of the treatment apparatus through a discharge port 5, substantially ammonia/ammonium-free.

Sorbing ammonium out of waste-water is of course well-known, and it is well-known that a properly-engineered sorption station can be very effective at driving the ammonium level down to insignificant concentrations, in waste-water discharged from the sorption station, and that such a sorption station need not be expensive.

By comparison, a facility in which the ammonium was being taken out of the waste-water directly by electrolysis (as in U.S. Pat. No. 6,083,377), would be considerably less economical than the corresponding sorption station that would be needed in order to drive the waste-water down to a given (low) concentration. On the other hand, of course, in a sorption station, the ammonium remains intact, whereas in an electrolytic station the ammonium is converted directly to nitrogen gas.

When the sorbent material in e.g column 3 has become saturated with ammonium, water-flow control valves 34 are operated, to divert the incoming waste-water stream away from the saturated column 3 to one of the other columns. Control valves are operated also to cause water from a regenerant tank 8 to circulate through the saturated column 3. The regenerant circulation through column 3 is indicated by the dotted arrows in FIG. 1. The valves can be operated in such manner as to pass the regenerant-water from the tank 8 through the other columns 1,2, of course, as and when the columns become saturated with ammonium.

The body of secondary-water is, in this case, the regenerant water from the tank 8, which flushes through the ion-exchange resin in the column 3. This is water that has been charged with a high concentration of sodium chloride (i.e the regenerant-water is concentrated brine). The sodium ions displace the ammonium, on the sorbent material, in the column. The ammonium passes into solution, now into the regenerant-water. The sodium ions remain on the sorbent media. The flow of the regenerant-water is controlled by the various valves and pumps, in the regenerant tank 8, in the electrolysis station 24, and elsewhere, as shown.

The design of the ion-exchange station, in itself, may follow traditional technology. The salt dissolved in the regenerant-water may be sodium chloride, which is satisfactory, and inexpensive. Other salts may be used in the regenerant-water, to provide the ion-exchange function, such as potassium and calcium chloride salts.

In some cases, it might be preferred to increase the pH of the brine to say ten; this shifts the redox equilibrium from soluble ammonium more towards ammonia gas, which can assist in extracting ammonium from the ion-exchange columns down to even lower levels.

Traditionally, the ion-exchange sorbent material may comprise naturally occurring materials such as zeolites, or equivalent synthetic resins that function as cation exchangers, and that tradition may be followed in the present case. Preferably, the sorbent media material should be so configured as to specifically target ammonium as the substance to be sorbed.

When the ion-exchange media in the column 3 has been flushed clear of ammonium, the control valves 34 are again operated, to make the column once again open to the incoming flow of waste-water, and available for sorbing ammonium out of the waste-water. The now-flushed ion-exchange media can function, once again, to capture ammonium ions out of solution, i.e out of the waste-water being treated.

The engineer may prefer to run the incoming waste-water through more than one of the columns, if more than one is available, running the waste-water first through the column that is most nearly saturated, and then through the less-saturated column.

The regenerant-water, upon returning from the ion-exchange column, contains a high concentration of ammonium. In accordance with the invention, the ammonium-laden regenerant-water (secondary-water) is circulated through the electrolysis station 24. Here, the ammonium is broken down, and the nitrogen component thereof is released as nitrogen gas, at 10. The ammonium contained in the regenerant-water, being the ammonium that has been flushed out of the sorbent in the column, is at a higher concentration in the regenerant-water than it was in the waste-water passing through the columns, and again it is noted that electrical energy can be used to promote the ammonium breakdown reactions, by electrolysis, with much improved efficiency, if the ammonium concentration is high.

The breakdown reactions that take place in the electrolysis station 24 will now be considered. In the electrolysis station, the ammonium dissolved in the regenerant-water, or secondary-water, is broken down at the anode into nitrogen gas. The reaction creates hydrogen ions and electrons. Chloride ions in the water also react at the anode, producing chlorine and electrons. The chlorine dissolves in and combines with water, to form hydrochloric and hypochlorous acids. Ammonium still present in the water then reacts especially with the hypochlorous acid, to create nitrogen (gas), and to release hydrogen ions and chloride ions into the water. (It is recognised that parallel reactions can be engineered using bromide and other halide salts.)

Thus, the main electrolytic reactions of interest are oxidation reactions that occur at the anode, which include:

$2NH_4^+ \rightarrow N_2 + 8H^+ + 6e^-$ and $2Cl^- \rightarrow Cl_2 + 2e^-$

The chemical reactions that result include:

$Cl_2 + H_2O \rightarrow HOCl + HCl$ $2NH_4^+ + 3HOCl \rightarrow N_2 + 3H_2O + 5H^+ + 3Cl^-$ These reactions are simple enough to engineer. It is possible to monitor and control the pH and the redox voltage of the regenerant-water passing through the electrolytic cell 9, but it is recognised that the conditions can readily be engineered without close control. Once the conditions have been thermodynamically created in which the reactions take place, the tendency of the ammonium to transform directly to nitrogen gas is very strong. Very little of the unwanted oxidation products, such as nitrate and the various nitrogen oxides, are produced.

Thus, the ammonium in the regenerant-water is disposed of, leaving nothing but nitrogen gas, and a little acidity in the regenerant-water. This latter can be dealt with by suitable pH control measures. In FIG. 1, these include a pH sensor 13, and a reservoir 12 of a caustic. When the caustic is sodium hydroxide, that also serves to replenish sodium lost in the regenerative process.

It may be noted that chlorine (in the form of HOCl) in the regenerant water, having taken part in the reactions, then reverts back to chloride. Basically, the regenerant water, at the end of the ion-exchange and electrolysis cycle, is now in more or less the condition it was in before the ion-exchange took place. With provision for filtration/precipitation of impurities, and for adding small make-up quantities of its constituents, as necessary, the regenerant water is made ready to participate in further electrolysis reactions. In fact, the regenerant water can be recycled for an indefinite period. The amount of waste material generated by making the regenerant water suitable for recycling over long periods is tiny, whereby a comparison can hardly be made between disposing of this tiny amount of waste, and disposing of vast quantities of inadequately-treated ammonium-rich wastewater.

The regenerant-water, being of high ionic strength, has a low electrical resistance. It is the regenerant water that becomes the electrolyte of the electrolytic cell 9, in the electrolysis station 24, whereby this low resistance assists in ensuring that the electrical energy requirements of the station are minimised.

It is noted that the regenerant-water contains sodium chloride, or some similar salt, in high concentration. It is recognised that the presence of such salt in the regenerant-water means that the regenerant-water is much more electrically-conductive than was the waste-water. Thus, the energy needed to electrolyse the regenerant-water, simply because the regenerant-water is salty, is much diminished, compared with the energy needed to electrolyse the waste-water itself, directly.

As explained, the regenerant-water, though subject to occasional make-up of some of its constituents, basically is unchanged by the ion-exchange/electrolysis cycle, and can be recycled and reused over a long period. This may be contrasted with many traditional ion-exchange systems, in which the regenerant-water is used once, to capture the contaminant, and then discarded with the contaminant still intact.

In the present case, treating ammonium by the combination of the ion-exchange and electrolysis means that: (a) the contained volume of regenerant-water can be tailored to the requirements of efficient electrolysis much more readily than can a stream of waste-water; (b) the fact that the regenerant-water is of high ionic strength means that the electrical resistance of the water is low, which leads to efficient electrolysis; and (c) the overall ammonium reaction cycle leaves the regenerant-water chemically unchanged, i.e as it was before the ammonium was captured, and thus able to be recycled.

Figure 2:
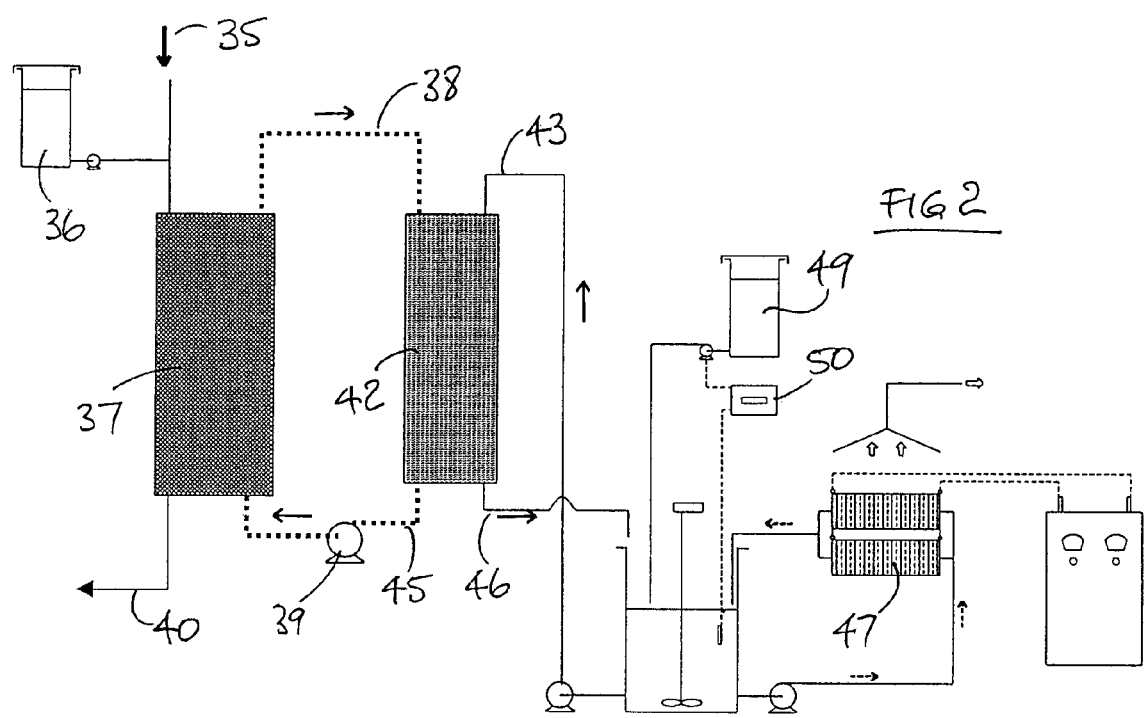
FIG. 2 is a diagram showing elements of apparatus that have been combined and configured in an alternative manner to operate in accordance with the invention.

FIG. 2 shows an alternative, herein termed the alkali-acid system, whereby the ammonium is extracted from the stream of waster-water and transferred to the body of secondary-water. In FIG. 2, the incoming water is first treated with e.g sodium hydroxide, to raise its pH. The invention makes use of the fact that, at elevated pH, ammonium dissolved in the water comes out of solution, and is transformed into ammonia gas.

Preferably, the alkali-acid system is used mainly when the waste-water stream is contaminated to a high concentration of ammonium, but the overall flow rate of the waste-water stream is comparatively low. Such a high-concentration stream can arise in a sewage treatment plant, for example, being the water that has arisen from de-watering the sewage sludge. Or, such a high-concentration stream can arise in a chemical plant, for example, that uses ammonium. It is noted that, when a high-concentration ammonium stream is present, it is almost invariably the case that a low-concentration stream is also present, at a much higher flowrate, and both streams need to be treated. However, the high concentration stream should not simply be mixed with the low-concentration stream, for combined treatment, because the colonies of bacteria that break down the organic contaminants of the waste-water might be wiped out by even a momentary application of highly concentrated ammonium.

It will usually be preferred, therefore, to treat the small, high-concentration, stream in the alkali-acid system, and then to mix that effluent water stream in with the main waste-water stream, with its rather lower concentrations. It is recognised that the alkali-acid system is most economically effective when it is used to drive the ammonium concentration down from high levels to medium levels; on the other hand, the ion-exchange system is at its most economically effective when used to drive the ammonium concentration from medium levels right down to the environmentally-safe-to-release levels (typically, below one mg/litre of ammonia/ammonium-N).

The alkali-acid system might be used to drive the high ammonium concentrations down to very low levels, directly, but that can be uneconomical as to use of resources, and can entail raising the pH of the waste-water to uncomfortably-high levels.

The two systems thus can complement each other, and preferably they may be used together, alongside each other in the same water treatment facility. It is noted, again, that the ion-exchange system and the alkali-acid system are utilised for extracting ammonium from the waste-water stream, and for transferring the ammonium into the body of secondary-water. In both systems, the ammonium is then removed from the secondary-water in an electrolysis station, by being transformed into gaseous nitrogen.

In FIG. 2, the incoming waste-water stream 35 has its pH raised to e.g ten, using a reservoir 36 of caustic soda. The high-pH waste-water passes through an alkali column 37. Here, the ammonia gas bubbles out of the waste-water stream. The ammonia gas is carried away by a forced air circulation circuit 38, including a fan 39. The (cleaned) waste-water stream is discharged at 40—either into the environment, or mixed with another incoming waste-water stream for further treatment, as just described.

The air/ammonia gases now pass into the acid column 42. At 43, water at low pH, e.g at the four or three pH level, enters and circulates down through the column. The ammonia gas readily passes into solution in such acid-water, forming ammonium, whereby the concentration of ammonia in the air emerging at 45 is much reduced. Thus, the acid-water emerging at 46 from the acid column 42 now contains the ammonium extracted from the waste-water stream 35, and is the secondary-water of the invention. The secondary-water circulates and recirculates through the electrolytic cell 47, in much the same manner as described above in relation to the ion-exchange system, whereby the ammonium is transformed to gaseous nitrogen, and discharged.

The more acidic the acid-water entering at 43, the more ammonia gas is extracted from the air/ammonia mixture, whereby, at a low pH (e.g four or three), the gas now entering the alkali column 37 has a very low concentration of ammonia. The lower the ammonia concentration of the gas passing to the alkali-column, at 45, the more efficiently the ammonium can be taken out of solution from the waste-water. It may be noted that it is no hardship for the designer to provide for the fact that the secondary-water is at low pH—as compared with the problems that would be encountered if it were the waste-water stream that had to be of that low pH.

In FIG. 2, the secondary-water is driven to the required low pH levels by the addition of e.g hydrochloric acid. A reservoir 49 and metering/control system 50 are provided for this purpose.

It may be noted that water at low-pH, like water containing sodium chloride, has a low electrical resistance, which aids economy of electrolytic treatment. When the ammonium is extracted and transferred using the ion-exchange system, as in FIG. 1, the secondary-water can be characterised as brine; when the ammonium is extracted and transferred using the alkali-acid system, as in FIG. 2, the secondary-water can be characterised as hydrochloric acid. In both cases, the transformation of dissolved ammonium to gaseous nitrogen, can be done economically by electrolysis.

It was described in relation to the ion-exchange system (FIG. 1) that it is often possible to arrange for the secondary-water (i.e the regenerant-water), having taken on ammonium in the ion-exchange station, and having discharged that ammonium in the electrolysis station, to be restored to more or less the same condition it would have been in if it had not passed through the two stations. That is to say, the secondary-water could be (almost) self-replicating. As such, the secondary-water can be re-circulated through the ion-exchange system more or less indefinitely.

In the alkali-acid system, it is not so easy for the designer to arrange for the secondary-water to be similarly self-replicating. It is generally necessary to add fresh hydrochloric acid, at 49,50, to the secondary-water, on a more or less continuous basis. However, it is noted again that the release of nitrogen gas in the cell 47 is itself a factor in making the electrolyte in the cell more acidic; and, in some cases, it is indeed possible to arrange that the acidity created by the release of nitrogen keeps the secondary water at sufficiently low pH levels as to dissolve virtually all the ammonia out of the air/ammonia mixture, at 45, as the secondary-water passes through the acid column 42, without the need for further hydrochloric acid to be added.

The secondary-water can never be totally self-replicating. Depending on the chemical characteristics of the waste-water stream, the secondary-water might pick up impurities, enough to affect its ammonium-flushing abilities, or to affect the efficiency of the electrolysis process, or otherwise to spoil the smooth operation of the treatment plant. The impure secondary-water might have to be periodically conditioned using precipitation and filtration, to remove undesirable compounds. However, the amount of waste generated by this process would be very small, as compared with the problem of disposing of vast quantities of inadequately-treated ammonium-rich waste-water.

In the ion-exchange system (FIG. 1), the secondary-water preferably should be driven down to very low concentrations of ammonium, in order for the regenerant water to be able to remove as much ammonium as possible from the ion-exchange resin in the columns 1,2,3. The lower the concentration of ammonium in the regenerant-water, the more effective the ion-exchange process can be, in flushing the ammonium ions out of the material in the columns 1,2,3, and into the regenerant water. Thus, it is preferred to circulate the brine (regenerant water) through the electrolytic cell 9 and through the column continuously; then, as the electrolysis progresses, and the concentration of ammonium in the brine gradually diminishes, so the last remnants of ammonium stored in the sorbent can finally be captured.

The same point can be applied in the alkali-acid case, in that, again, the secondary-water should be recirculated through both the acid-column 42 and the cell 47 continuously. This point has a number of aspects, however.

Of course, the secondary-water should not be constituted as a stream that passes through the system just once and is then discharged, as that would be most wasteful. The secondary-water preferably should be arranged to recirculate through both the acid-column and the electrolysis cell. However, it is not necessary, especially in the alkali-acid system, for the secondary-water to circulate through both stations simultaneously.

Thus, it may be arranged that the secondary-water be processed in two quite-separate steps, i.e that the secondary-water be first recirculated through the acid column, to take on ammonium, and then be stored in a tank. The electrolysis is carried out later (when again the secondary-water should be recirculated through the cell). In this arrangement, the acid-column phase is finished and completed before the secondary-water is transferred to the electrolysis station, and the electrolysis is finished and completed before the secondary water is moved back to the acid-column. This complete lack of simultaneous processing is not preferred.

In the case of the alkali-acid system, the real preference lies in what may be termed batch recirculation. Here, at first, the acid-water is recirculated only through the acid-column and not through the electrolytic cell, until the ammonium concentration builds up to, say, twenty percent. The optimum pH for this phase might be e.g three in a particular case. But then, the acid-water is passed through the electrolysis station, for which the optimum pH might be e.g six or seven. (The acid-water might continue to circulate through the acid-column as well during the electrolysis phase.)

After a time, once the ammonium concentration in the acid-water has decreased, the pH of the acid-water is lowered again, and the acid-water is circulated once again only through the acid-column. In other words, the most efficient way of processing the acid-water, in some cases, is to vary the pH periodically, so as first to favour the transfer of ammonia into solution, and then to favour the transformation to nitrogen gas, alternately.

It is emphasised that in neither system is it preferred for the two phases of secondary-water processing to be separated entirely. If it were arranged that one phase was finished and completed before the alternate phase was started, considerable inefficiencies would arise due to the large variations of concentration.

The electrolytic cell 9,47 preferably is structured with many anodes and cathodes, and the cell may be of divided configuration, in which membranes separate the anodic and cathodic compartments, or undivided. The cell electrodes can be configured in bipolar or mono-polar arrangement, as required. The anodes can be coated with a catalytic material (platinum or various metal oxides, for example) for promoting the desired reactions. The designer should aim to operate the electrochemical reactor at a current density such that the anode half-cell potential is maintained above 1.2 volts (with respect to a standard hydrogen electrode), to promote the anode reactions described above.

Figure 3:
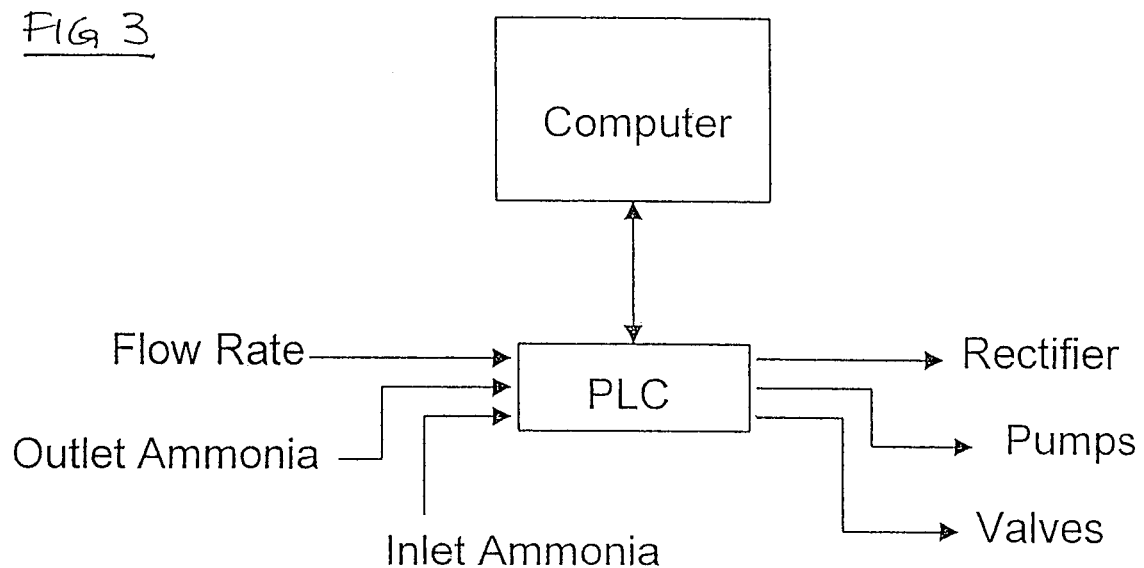
FIG. 3 is a diagram showing some aspects of the control of a system that embodies the invention.

The ease may be noted with which the treatment plant can be automated. FIG. 3 shows a basic system. Sensors may be used to monitor waste-water inlet-port and discharge-port ammonia concentrations, and it is recognised that it is adequate, in many cases, if the control of the whole system is based on these two measurements. More sophistication may be added, for example with sensors for monitoring the status of the electrolysis breakdown reactions, but still the sensors themselves are simple, and the actions resulting from the signals therefrom simply cause valves to open and close, to regulate flows and circulations through the system. The sensors may include e.g sensors 6,7 for ammonium concentration, pH levels, voltage and amperage magnitudes, and so on.

One of the important aspects of electrical system control 11 is to switch off the power to the cell when the reactions are complete. This should be done neither too early (which would leave some ammonium in the secondary-water), nor too late (which wastes electricity). The electrolysis time can be computed (having done pilot experiments to determine the operational characteristics of the cell) if the mass of ammonia/ammonium-N that has been transferred to the secondary-water is known—and, as mentioned, that mass can be computed, to a usually-adequate degree of accuracy, simply by comparing the ammonium concentration in the incoming waste-water stream with that in the discharge stream. The control system would compute the length of electrolysis time needed to remove that mass of ammonium. It will probably also be required to do pilot tests to determine the loading capacity of the ion-exchange columns, and/or the alkali and acid columns, to complete the data needed to enable these computations to be done.

Once the secondary-water has been electrolysed enough to deplete the ammonium content, the power to the cell is simply switched off. In some cases, sensors, as such, may not be needed, in that it is sufficient for the cell to be operated by a simple timer. Again, the length of time the cell should be energised can be determined by calculation, knowing the amount of ammonium transferred into the secondary-water.

Figure 4:
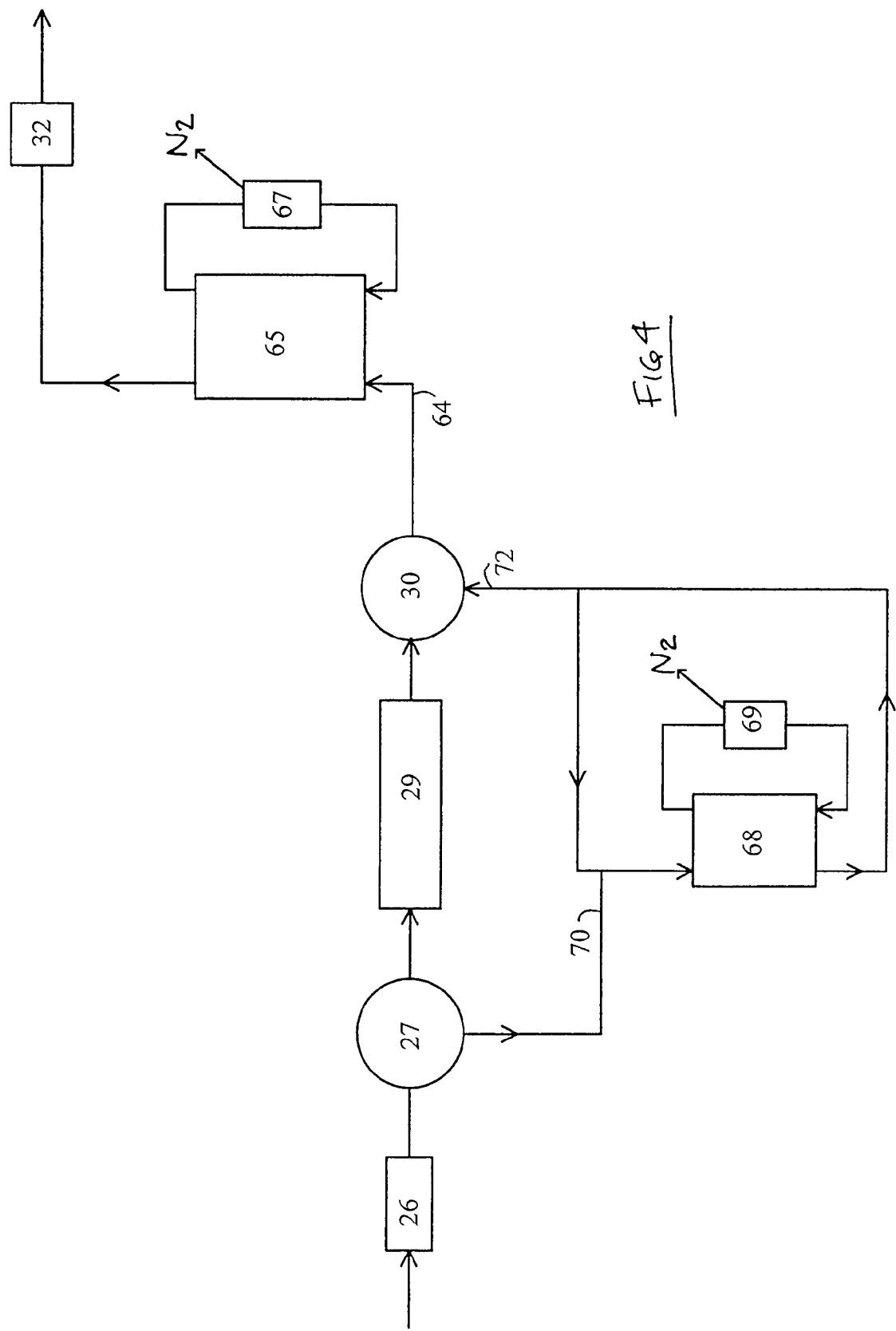
FIG. 4 is a diagram of a municipal waste-water treatment plant, which includes apparatus similar to FIGS. 1 and 2.

FIG. 4 shows how the apparatus of FIG. 1 and the apparatus of FIG. 2 may be incorporated into e.g a municipal sewage treatment plant. The main volume of effluent from the sludge-settling portion of the plant passes, at 64, to the ion-exchange station 65 and its electrolysis station 67. The water emanating from the sludge de-watering area, with its higher ammonium concentration, at 70, is dealt with by the alkali-acid station 68 and its electrolysis station 69. The treated water from the alkali-acid station 68, at 72, is mixed with the main stream of waste-water 64 entering the ion-exchange station 65.

As shown in FIG. 4, other stations may be provided in the plant, including grit removal 26, primary clarifier 27, activated sludge reactor 29, secondary clarifier 30, and UV or chlorination treatment 32. It is preferred that the waste-water being treated be conducted through the ion-exchange columns after the waste-water has passed through the other stations, at least through those whereby suspended solids and dissolved organic material have been removed.

It should be noted that, since the ammonium is dealt with by the ion-exchange and electrochemical system as described herein, these other treatment stations in the municipal system can be better engineered for their roles of breaking down and removing organic contaminants from the water. In traditional treatment systems, the other stations sometimes have to be compromised by having to provide habitation for aerobic microbes for ammonium treatment. Now, these stations, being relieved of the task of ammonium oxidation, can be optimised for the task of breaking down the organic contaminants.

The facilities such as chlorination 32, for pathogen removal, should preferably be placed after the ammonium treatment stations.

It should be noted also that traditional aerobic microbiological ammonium-oxidation stations take up a good deal of ground space. By contrast, the various columns as described may be arranged vertically (i.e as packed-bed or fluidized-bed columns), thus permitting a saving in required space. The components of the secondary-water circuit, including the electrolytic cell, do not take up much space, on the scale on which traditional aerobic stations are measured.

Other areas in which the described technology may be applied (other than main municipal water treatment facilities) include:

Treatment of effluent from sewage treatment lagoons or ponds. Sewage lagoons are often used by small communities for municipal waste-water treatment. The ion-exchange and electrochemical system could be used to remove ammonia from the effluent prior to discharge.

Treatment of mine waste water contaminated as a result of blasting agents and other processing circuits.

Treatment of effluent from food processing.

Treatment of industrial waste-water, such as from factories making fertiliser products.

Some further points regarding the design of a treatment system that is to function in accordance with the invention will now be addressed.

The system as described herein can be used on a large municipal scale; or it can be used to treat the waste-water stream from a house, or a few houses, prior to discharge into a lake or river; or it can be used to treat the ammonium-rich waste-water stream from say a fertiliser factory. In each case, in practising the invention, the electrolysis station 24 would be related to the ammonium-extraction and ammonium-transfer stations on the basis that the electrolysis station is always able to convert to nitrogen gas all the ammonium captured by the extraction and transfer stations. The prudent designer will of course provide a margin of excess capacity in each station, and/or provide the stations as a plurality of modules, which can be switched in an out of operation as required.

The alkali-acid system can be run continuously, and valves are not needed to divert the water—at least not for operational purposes. The operation of the ion-exchange system of course does involve regularly diverting the waste-water stream away from the column containing the saturated ion-exchange media. As mentioned, it is preferred to keep the regenerant-water circulating through the column at the same time that it is circulating through the electrolysis station. One reason only one ion-exchange column would not be preferred is that, with only one column, the one column has to be quickly put back on line, to minimise the interruption to the incoming waste-water stream; and of course it is not possible then to circulate the regenerant-water through the column.

Usually, and preferably, it will be arranged that there is a plurality of columns (as in FIG. 1), each one in an ion-exchange relationship with the body of regenerant water. The waste-water stream then can continue when one column becomes saturated, the stream simply being routed through one of the other columns. Where the electrolysis station has to cope with the ammonium from several columns, the designer of course should see to it that the electrolysis station can break down the ammonium in the body of regenerant water faster than the ammonium is being fed into the body of regenerant water in aggregate from the several columns.

In a case where the waste-water stream is not to be shut off (in a municipal treatment system, for example), preferably three ion-exchange columns (or beds) are provided. Just one body of regenerant-water is provided, and the system can be set to direct the body of regenerant water through each of the columns sequentially. Just one electrolysis station is provided. During electrolysis, the body of regenerant-water preferably is circulated continuously through the appropriate one of the columns and through the electrolysis station.

As mentioned, the electrolysis station must convert the ammonium dissolved in the secondary-water to nitrogen gas at a faster rate than the rate at which ammonium-N is being captured into the secondary-water. Thus, the electrolysis station, in a typical case, might have to oxidise e.g fifteen kg of nitrogen per day. In that case, a current in the region of 3500 amps would be needed, with a desired operating voltage of less than four volts. An electrolysis station capable of handling that quantity of nitrogen would typically be operated at a current density of between 300 and 1000 amps per square metre of the anode.

The invention claimed is:

1. Apparatus for diminishing the concentration of ammonium in waste-water, and for disposing of the ammonium as nitrogen gas, wherein:
   the apparatus includes an ammonium-extraction station, which:
      includes a waste-water entry port, for receiving a stream of the waste-water to be treated;

is operable to extract ammonium out of solution from the waste-water stream;

includes a treated-water discharge port, for discharging the waste-water stream, now with its dissolved ammonium content reduced, from the apparatus;

the apparatus includes a body of secondary-water;

the apparatus includes a secondary-water circuit, comprising water-containment components, which contain the body of secondary-water;

the apparatus includes an ammonium-transfer station, which is one of the water-containment components of the secondary-water circuit, and which is operable to receive the ammonium extracted from the ammonium-extraction station, and to transfer same into the body of secondary water;

the apparatus includes an electrolysis station, which is one of the components of the secondary-water circuit;

the electrolysis station includes an electrolytic cell, which is operable upon being supplied with electrical energy;
  to electrolyse the secondary-water, and to oxidise the ammonium dissolved therein;
  to thermodynamically favour the transformation of the nitrogen component thereof to nitrogen gas;

the apparatus includes a nitrogen-discharge port, for discharging the resulting nitrogen gas from the electrolysis station;

the apparatus includes an intermediate tank, which is one of the water-containment components of the secondary-water-circuit;

the ammonium-transfer station has an ammonium-station-inlet and an ammonium-station-outlet, through which secondary-water respectively enters and leaves the ammonium-transfer station;

the ammonium-transfer station is so configured that secondary-water in the ammonium-station-outlet is at a higher concentration of dissolved ammonium than secondary-water in the ammonium-station-inlet;

the electrolysis station has an electrolysis-station-inlet and an electrolysis-station-outlet, through which secondary-water respectively enters and leaves the electrolysis-station;

the electrolysis station is so configured that secondary water in the electrolysis-station-outlet is at a lower concentration of dissolved ammonium than secondary-water in the electrolysis-station-inlet;

the secondary-water circuit includes respective conduits that convey secondary water:
  from the ammonium-station-outlet into the intermediate tank;
  from the intermediate tank into the ammonium-station-inlet;
  from the electrolysis-station-outlet into the intermediate tank; and
  from the intermediate tank into the electrolysis-station-inlet.

2. Apparatus of claim 1, wherein the apparatus includes means for adjusting the pH level of secondary-water residing in the intermediate tank.

3. Apparatus of claim 1, wherein the apparatus includes means for ensuring that secondary-water residing in the intermediate tank is mixed.

4. Apparatus of claim 3, wherein the means for ensuring that secondary-water residing in the intermediate tank is mixed comprises an operable powered mixer, which is effective, when operated, to mechanically stir secondary-water residing in the intermediate-tank.

5. Apparatus of claim 1, wherein the ammonium concentration of secondary-water entering the ammonium-station through the ammonium-station-inlet is substantially the same as the ammonium concentration of secondary-water entering the electrolysis-station through the electrolysis-station-inlet.

6. Apparatus of claim 1, wherein the pH of secondary-water entering the ammonium-station through the ammonium-station-inlet is substantially the same as the pH of secondary-water entering the electrolysis-station through the electrolysis-station-inlet.

7. Apparatus of claim 1, wherein the said respective conduits that convey secondary water:
  from the ammonium-station-outlet into the intermediate tank;
  from the intermediate tank into the ammonium-station-inlet;
  from the electrolysis-station-outlet into the intermediate tank; and
  from the intermediate tank into the electrolysis-station-inlet;
    are effective to so convey the secondary-water directly, in the sense that the secondary-water undergoes no substantial change of ammonium concentration therebetween.

8. Apparatus of claim 1, wherein the said respective conduits that convey secondary water:
  from the ammonium-station-outlet into the intermediate tank;
  from the intermediate tank into the ammonium-station-inlet;
  from the electrolysis-station-outlet into the intermediate tank; and
  from the intermediate tank into the electrolysis-station-inlet;
    are effective to so convey the secondary-water directly, in the sense that the secondary-water undergoes no substantial change of pH level while being conveyed therebetween.

9. Apparatus of claim 1, wherein the stream of waste-water being treated passes through the apparatus, and is discharged, without itself being subjected to electrolysis.

10. Apparatus of claim 1, wherein the stream of waste-water being treated passes through the apparatus, and is discharged, without touching the body of secondary-water.

11. Apparatus of claim 1, wherein the apparatus is operable to circulate and recirculate the body of secondary-water through the electrolysis station, and the apparatus is operable to perform the electrolysis periodically, while the body of secondary-water is recirculating through the ammonium-transfer station.

12. Apparatus of claim 1, wherein:
  an ion-exchange station of the apparatus combines the ammonium-extraction station and the ammonium-transfer station;
  the ion-exchange station includes a sorbent-container, in which is contained a sorbent-body, which is effective to sorb ammonium from water passing therethrough;
  the secondary-water comprises regenerant-water, being water that contains, in solution, a regenerant-substance, which is of such nature, and of such concentration, as to have an ion-exchange relationship with respect to ammonium ions sorbed onto the sorbent-body;
  the ion-exchange station includes connecting conduits and operable flow-control valves therein;

the valves are operable to set the ion-exchange station into a sorption-mode and are operable to set the ion-exchange station into a regenerant-mode;

in the sorption-mode, the valves and conduits are arranged so that waste-water passes from the waste-water entry port, through the sorbent-container, and out of the treated-water discharge port; and in the regenerant-mode, the valves and conduits are included in the secondary-water circuit, in which the regenerant-water, having passed through the sorbent-container, passes then through the electrolytic cell.

13. Apparatus of claim 12, wherein the secondary-water circuit is operable to recirculate the regenerant-water through the sorbent-container and the electrolytic cell.

14. Apparatus of claim 12, wherein the body of secondary-water is, or includes, brine.

15. Apparatus of claim 1, wherein:
an alkali-acid station of the apparatus combines the ammonium-extraction station and the ammonium-transfer station;
the body of secondary-water comprises a body of acid-water;
the alkali-acid station includes:
 a means for elevating the pH of ammonium-laden waste-water entering the waste-water entry port to at least ten;
 an alkali-station, comprising a waste-water conduit containing the alkaline waste-water and a gas conduit, and the alkali-station is so structured that ammonia gas emanating from the alkaline waste-water in the waste-water conduit is captured and carried away in the gas conduit;
 a means for maintaining the pH of the acid-water at no more than four;
 an acid-station, which includes the gas conduit and an acid-water conduit containing the acid-water, and the acid-station is so structured that ammonia gas contained in the gas conduit is taken into solution in the acid-water in the acid-water conduit;
and the secondary-water circuit includes the acid-water conduit, in which the acid-water, having passed through the acid-station, passes then through the electrolytic cell.

16. Apparatus of claim 15, wherein the secondary-water circuit is operable to recirculate the acid-water through the acid-station and the electrolytic cell.

17. Apparatus of claim 15, wherein the body of secondary water is, or includes, hydrochloric acid.

18. Water treatment plant, for treating both a lower-flowrate stream of higher-concentration waste-water and a higher-flowrate stream of lower-concentration waste-water, wherein:
the plant is operable to pass the lower-concentration stream through the ion-exchange station of claim 12, and the higher-concentration stream through the alkali-acid station of claim 15;
and the plant is operable to mix the treated waste-water effluent from the alkali-acid station with the waste-water stream entering and passing through the ion-exchange station.

19. The use of the apparatus of claim 1 to oxidise ammonium to nitrogen gas.

20. Procedure including:
providing the apparatus of claim 1;
operating the apparatus to diminish the concentration of ammonium in the body of secondary-water, including adding pH-altering chemicals to the intermediate tank, as required.

21. The use of the procedure of claim 20 to oxidise ammonium to nitrogen gas.

22. Apparatus for diminishing the concentration of ammonium in a body of secondary-water, and for disposing of the ammonium as nitrogen gas, wherein:
the apparatus includes a body of secondary-water;
the apparatus includes a secondary-water circuit, comprising water-containment components, which contain the body of secondary-water;
the apparatus includes an ammonium station, which is one of the components of the secondary-water circuit;
the apparatus is so arranged that ammonium is added to secondary-water passing through the ammonium station;
the apparatus includes an electrolysis station, which is one of the components of the secondary-water circuit;
the electrolysis station includes an electrolytic cell, which is operable upon being supplied with electrical energy:
 to electrolyse the secondary-water, and to oxidise the ammonium dissolved therein;
 to thermodynamically favour the transformation of the nitrogen component thereof to nitrogen gas;
the apparatus includes a nitrogen-discharge port, for discharging the resulting nitrogen gas from the electrolysis station;
the apparatus includes an intermediate tank, which is one of the components of the secondary-water-circuit;
the ammonium station has an ammonium-station-inlet and an ammonium-station-outlet, through which secondary-water respectively enters and leaves the ammonium-station;
the ammonium station is so configured chat secondary-water in the ammonium-station-outlet is at a higher concentration of dissolved ammonium than secondary-water in the ammonium-station-inlet;
the electrolysis station has an electrolysis-station-inlet and an electrolysis-station-outlet, through which secondary-water respectively enters and leaves the electrolysis-station;
the electrolysis station is so configured that secondary water in the electrolysis-station-outlet is at a lower concentration of dissolved ammonium than secondary-water in the electrolysis-station-inlet;
the secondary-water circuit includes respective conduits that convey secondary water:
 from the ammonium-station-outlet into the intermediate tank;
 from the intermediate tank into the ammonium-station-inlet;
 from the electrolysis-station-outlet into the intermediate tank; and
 from the intermediate tank into the electrolysis-station-inlet.

* * * * *